United States Patent [19]
Larro

[11] 4,248,131
[45] Feb. 3, 1981

[54] FASTENING DEVICE

[76] Inventor: Harold D. Larro, 16376 SW. 72nd Ave., Tigard, Oreg. 97223

[21] Appl. No.: 16,220

[22] Filed: Feb. 28, 1979

[51] Int. Cl.³ .......................... F16B 13/08; F16L 5/00
[52] U.S. Cl. ..................................... 411/15; 411/352; 285/162; 285/196; 403/197
[58] Field of Search ...................... 85/80, 81, 3 S, 3 R; 285/196, 208, 219, 162; 403/252, 197, 194; 339/128; 174/153 A, 65 R; 248/56, 57, 73; 151/41.75

[56] References Cited
U.S. PATENT DOCUMENTS

| | | | |
|---|---|---|---|
| 1,049,376 | 1/1913 | LeManquais | 85/80 |
| 2,387,468 | 10/1945 | Ritzel | 85/3 S X |
| 2,398,041 | 4/1946 | Russell | 285/208 |
| 2,452,184 | 10/1948 | Cole | 285/196 X |
| 3,181,899 | 5/1965 | McKnight | 285/208 X |
| 3,415,549 | 12/1968 | Chatham | 339/128 X |

FOREIGN PATENT DOCUMENTS
2269673  11/1975  France ...................................... 285/196

*Primary Examiner*—Ramon S. Britts
*Attorney, Agent, or Firm*—John L. McGannon

[57] ABSTRACT

An improved device for interconnecting a pair of different parts together, such as the fastening of a pitot tube to the side wall of an air flow duct of an air conditioning system. The device includes a barrel having a number of resilient legs mounted thereon near one end thereof, the barrel being externally threaded to receive a hex nut or the like. The legs, which initially project laterally from the barrel, are movable into positions extending longitudinally of and adjacent to the barrel as the barrel and legs are inserted into a hole in a second part. The legs spring back after passing through the hole and the outer ends of the legs engage the surface portion surrounding the hole when the nut is tightened on the barrel so that the first part carried by the barrel is effectively rigidly connected to the second part having the hole.

1 Claim, 4 Drawing Figures

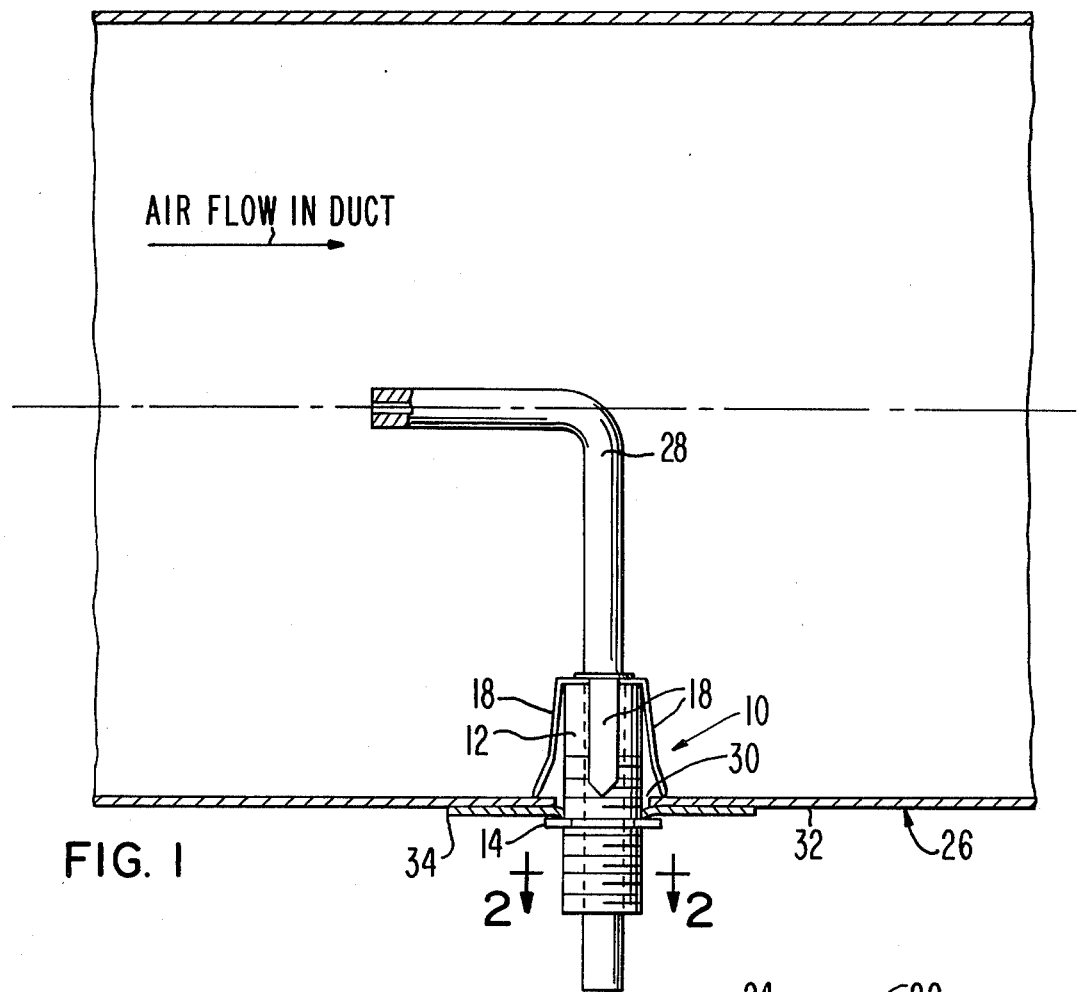
FIG. 1
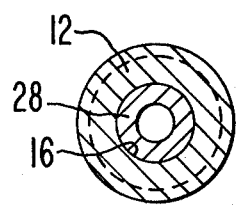
FIG. 2
FIG. 4
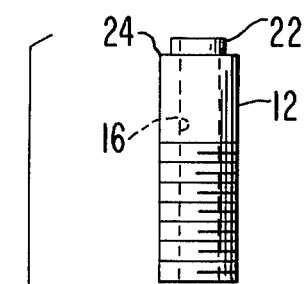
FIG. 3

FASTENING DEVICE

This invention relates to improvements in the fastening of two parts together and, more particularly, to an improved fastener which can readily interconnect two parts, such as a pitot tube and an air flow duct.

BACKGROUND OF THE INVENTION

Mounting devices of different types have been used in the past to interconnect two parts of an air flow system. For instance, a well-known fastening device is a bulkhead fitting which requires removing (by cutting) of a section of pipe or duct to which a connection is to be made. After installation, the bulkhead fitting is not again accessible without further removal of another section of the duct. However, it is a firm mounting.

Another type of fastening device for an air flow system is a cork or plug device insertion. It requires only the drilling of a hole in the duct or pipe and the installation is simple. However, the mounting is not firm and there is a possibility of fluid leakage near the device.

A molly bolt is another typical conventional mounting device for an air flow system. To use this device, only a single hole in a duct is required but mounting is often not precise and is not leak proof. Glue or Silastic mounting is a fourth type of mounting. However, this is a messy procedure and mounting is not firm. It requires only a hole in the duct and usually it is leak-proof but this method is susceptible to wide temperature fluctuations.

Because of the drawbacks of the prior conventional devices, a need has arisen for an improved fastener which can be quickly and easily installed and provides a firm leak-proof connection between two parts.

SUMMARY OF THE INVENTION

The present invention satisfies the aforesaid need by providing an improved fastener which is adaptable to many sizes and use conditions involving the mounting of devices, such as pitot tubes, in air flow ducts of air conditioning systems and the like. The device of the present invention requires only the drilling of a reasonably small hole and, when used with a suitable gasket, provides an almost totally leak-proof joint yet two parts, such as the pitot tube and the air duct, are firmly interconnected without the need for further maintenance of the connection therebetween. The installation is not susceptible to large temperature differentials and the device of the present invention will accept a number of different tubular and sensing devices and, once installed, the devices are held in place rigidly and permanently. More importantly the device of the present invention need only require a drill and an open end wrench or pliers. Installation of the fastener device with another part attached to it will take no more than 5 minutes, reducing labor costs substantially.

The primary object of this invention is to provide an improved fastening device which permits a first part to be quickly and easily interconnected while the connection between the parts is firm and permanent and can be made leak-proof so that the device is suitable for use in mounting sensing devices in air flow ducts of air conditioning systems.

Another object of this invention is to provide a fastening device of the type described wherein the installation of the device requires only the drilling of a single hole slightly larger than the transverse dimension of the device so that no special skills are required to use the device yet the device provides a firm, permanent connection between two parts.

Other objects of this invention will become apparent as the following specification progresses, references being had to the accompanying drawing for an illustration of the invention.

IN THE DRAWINGS

FIG. 1 is a side elevational view of the fastening device of the present invention, showing the way the device is used with a pitot tube in an air flow duct;

FIG. 2 is a cross-sectional view taken along line 2—2 of FIG. 1;

FIG. 3 is an exploded view of the device, showing its various parts; and

FIG. 4 is an index plate to be used with a particular application of the device.

The fastening device of the present invention is broadly denoted by the numeral 10 and includes an elongated member which, for purposes of illustration, is a cylindrical barrel 12 which may be of any suitable material, such as aluminum. The barrel is machined to provide external threads thereon for threadably receiving a hex nut 14. The barrel is hollow to present a cylindrical passage 16 therethrough as shown in FIG. 3. One end of the barrel is machined so that its outside diameter is reduced by approximately 25% to present an end extension 22. Typically, this machining is done so that extension 22 has a length of approximately 1/16 inches but this length can vary as desired or deemed necessary.

Device 10 has a number of prongs or legs 18 which are secured to barrel 12 near extension 22. For purposes of illustration, there are four legs 18, only three of which are shown in FIG. 1. Legs 18 are formed by providing a piece of resilient material, such as stainless steel, sheared to a shape consisting of an inner ring 20 having the four legs 18 integral therewith. The legs extend radially outwardly of ring 20 and typically are 90° apart although this angle can vary as desired and there can be three legs or more than four legs. The unit having the legs 18 and ring 20 is typically die cut from a sheet of 22 gage stainless steel (mill finish).

In forming device 10, ring 20 is placed over extension 22 of barrel 12 so that the ring 20 rests flat against the end face 24 of the barrel adjacent to extrusion 22. The thickness of ring 20 is less than the axial length of extension 22 so that the part of extension 22 projects beyond ring 20. This part of the extension is collapsed over a ring 20 by a swaging action to permanently connect ring 20 to barrel 12. Other ways of connecting ring 20 to extension 22 can be used, if desired. In effect, device 10 is then complete and, in such a condition, legs 18 can project radially outwardly from the barrel or can be bent into the positions shown in FIG. 1. The ends of legs 18 are pointed for a purpose hereinafter described.

Fastening device 10 can be used in any number of different applications. One application is its use with an air flow duct 26 of an air conditioning system in which a pitot tube 28 is to be mounted in the duct. The outer diameter of pitot tube 28 is substantially the same as the inner diameter of passage 16 of barrel 12 so that the pitot tube can be inserted into barrel 12, is cemented or otherwise secured to barrel 12.

To use the device with pitot tube 28 attached thereto, a hole 30 is drilled in the side wall 32 of duct 26 and the hole is of a size of approximately ⅛ inch larger than the diameter of barrel 12. This over-sized hole will accommodate the movement of barrel 12 and legs 18 through the hole after pitot tube 28 has been inserted into the duct as shown in FIG. 1. Device 10 is pushed into and through the hole and, during this time, legs 18, if they project laterally and radially outwardly from the barrel, will be bent as shown in FIG. 1 and they immediately spring back once they are inside duct 26. Then, nut 14 can be threaded onto barrel 12 and tightened so that the ends of legs 18 "bite" into the inner surface of wall 32 thereby holding device 10 and pitot tube 28 firmly to the duct. An index plate 34, showing the direction of air flow through the duct can be used between nut 14 and wall 32 if desired. A Buna N gasket can be used between plate 34 and wall 32 to make a leak-proof joint.

The design of device 10 allows it to be used in many different applications. Typically, it can be made in one or two standard sizes (as each size is widely adapted to pipe configurations of various diameters) and then the inner diameter of passage 16 through barrel 12 can be varied to accept different sensing or measuring devices, such as pitot tube 28. Providing device 10 in this manner will reduce manufacturing costs as well as reducing the number of products that must be stocked for fastening purposes.

I claim:

1. A fastening device comprising: an elongated barrel for carrying an elongated part which is to be mounted to a wall with the part extending through a hole in the wall; a number of resilient legs coupled to the barrel adjacent to one end thereof and extending outwardly therefrom, the legs being bendable into positions contiguous to the barrel when the barrel and legs are to be inserted into the hole in said wall; the legs being capable of springing outwardly after the barrel and the legs have been inserted into the hole so that the ends of the legs will be engagable with one side of the wall surrounding the hole, said barrel having a threaded outer surface portion near the opposite end thereof; and a nut threadably engagable with said outer surface portion of the barrel, said nut adapted to be moved along the barrel and into coupled relationship with the opposite side of the wall for securing the barrel to the wall after the barrel and legs have been inserted into the hole.

* * * * *